United States Patent [19]

Bridges

[11] 4,219,936
[45] Sep. 2, 1980

[54] HOLE ANGULARITY GAGE

[75] Inventor: Thomas N. Bridges, Marietta, Ga.

[73] Assignee: The United States of America as represented by the Secretary of the Air Force, Washington, D.C.

[21] Appl. No.: 77,235

[22] Filed: Sep. 19, 1979

[51] Int. Cl.³ .............................................. G01B 3/22
[52] U.S. Cl. ................................ 33/174 Q; 33/172 R; 33/172 D
[58] Field of Search ............ 33/174 Q, 172 D, 169 C, 33/172 R, 173, 174 F

[56] References Cited

U.S. PATENT DOCUMENTS

| | | | |
|---|---|---|---|
| 2,700,224 | 1/1955 | Johnson | 33/174 Q |
| 3,114,978 | 12/1963 | Porter | 33/174 |
| 3,162,953 | 12/1964 | Porter | 33/174 |
| 3,206,858 | 9/1965 | Bernard | 33/174 F |
| 3,392,453 | 7/1968 | Snoddy | 33/174 F |

Primary Examiner—Willis Little
Attorney, Agent, or Firm—Joseph E. Rusz; Arsen Tashjian

[57] ABSTRACT

A gage for measuring the angularity of the centerline of straight and/or tapered holes with respect to a flat surface. A tapered pin is inserted into the tapered hole and the gage is placed over the pin and pushed against the surface of the material with the hole in it. A dial indicator provides a direct reading of the angle that the centerline of the hole varies from being perpendicular to the surface. For straight holes, an expanding collet is first inserted into the hole and then the tapered pin is inserted into the collet causing the collet to expand against the sides of the hole and provide an accurate reading on the indicator.

3 Claims, 1 Drawing Figure

U.S. Patent     Sep. 2, 1980     4,219,936
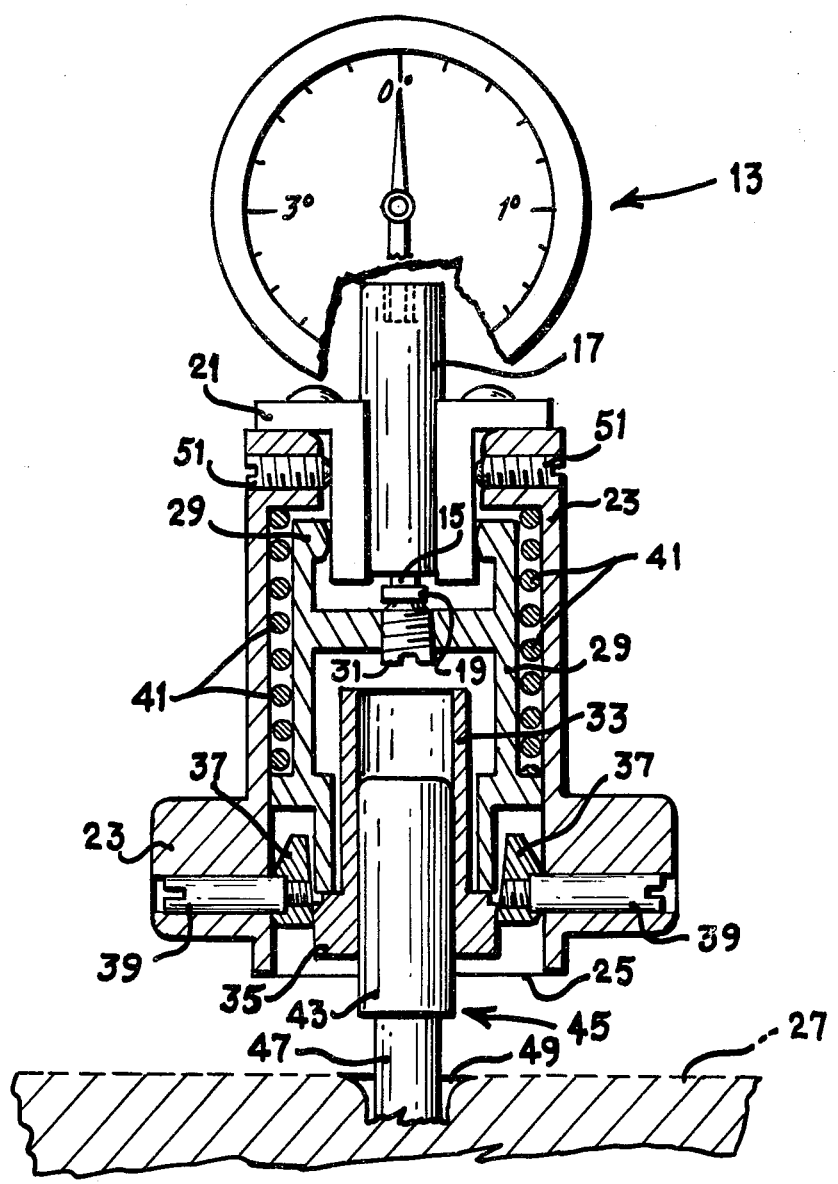

HOLE ANGULARITY GAGE

STATEMENT OF GOVERNMENT INTEREST

The invention described herein may be manufactured and used by or for the Government for governmental purposes without the payment of any royalty thereon.

BACKGROUND OF THE INVENTION

This invention relates to a device for measuring the angularity of straight and tapered holes and, more particularly, the invention is concerned with providing an angularity gage which reads directly in degrees and minutes instead of requiring the conversion of gage movement into angularity through trigonometric sine table.

Heretofore, various gages have been available for measuring the angularity of straight and tapered holes relative to the surface of the material in which the hole has been formed. In aircraft fastener holes, it is especially imporatnt that they be perpendicular to the workpiece in which they are drilled. In order to check the angularity of the holes, it would be necessary to provide a gage which is insertable into the hole and provides an indication of the condition of the hole. Although it is a relatively simple procedure to determine the accuracy of a straight hole, it is considerably more difficult to measure the angularity of a tapered hole.

One of the most commonly used arrangements for determining the accuracy of the holes is to insert tooling pins or fastener pins into the holes and use protractors with a surface table and height gage to find the angularity, if any. This procedure requires the measurement of the angle which is determined by reading of a dial indicator and making a series of calculations. Of course, there is always the possibility of error involved as well as the need for making a separate set-up for each and every angularity determination. Thus, it can be seen that it would be most desirable to provide an angularity gage which could be placed over the hole in the work piece and which would read directly the degrees and minutes that the hole deviates from the perpendicular.

SUMMARY OF THE INVENTION

This invention is concerned with providing an improved angularity gage which reads directly in degrees and minutes and which can be used equally well with straight walled holes and tapered walled holes. The gage includes a dial indicator calibrated in degrees and minutes attached to the upper end of a housing. The dial indicator is actuated when an inner gimbal which closely fits over a probe in the hole, tilts because the hole is not perpendicular to the workpiece causing an inner slide to move upward and raise a set screw attached thereto which actuates the dial indicator giving a direct reading in degrees and minutes that the probe (hole) is misaligned.

Accordingly, it is an object of the invention to provide an improved hole angularity gage which is held substantially perpendicular to the workpiece having the hole therein for obtaining accurate reading of the angularity of the hole.

Another object of the invention is to provide an improved angularity gage which gives direct readings of degrees and minutes as to the angularity of the hole with respect to the surface of the workpiece.

Still another object of the invention is to provide a hole angularity gage which is suitable for use in determining the angularity of both straight walled and tapered walled holes. When used for straight walled holes, a colet is first inserted in the hole and the probe is then inserted into the collet.

A further object of the invention is to provide an improved angularity gage which is suitable for measuring almost any size hole. On the larger size holes, an adapter is used to widen the base of the gage.

These and other objects, features and advantages will become more apparent after considering the following detailed description taken in conjunction with the annexed drawings and appended claims.

BRIEF DESCRIPTION OF THE DRAWING

The FIGURE is a view in partial cross-section of a hole angularity gage according to the invention showing the probe in position in the gage and showing a collet in the hole being measured.

DESCRIPTION OF A PREFERRED EMBODIMENT

Referring now to the drawing, there is shown an angularity gage according to the inventon including a dial indicator 13 calibrated in degrees and minutes. A downwardly extending plunger 15 is slidably mounted in a neck portion 17 of the indicator 13. The plunger 15 has a flat gage surface 19 at the lowermost end thereof. The neck portion 17 is tightly secured in the top cover 21 which encloses the upper end of the main housing 23. The lower end of the main housing 23 forms a flat annular surface 25 which contacts the workpiece 27 when in use to determine the angularity of a hole.

The main housing 27 is substantially cylindrical in configuration and includes an inner slide 19 slidably mounted for vertical movement therein. A set screw 31 is mounted on the inner slide 29 in contact with the gage surface 19 for adjusting the dial indicator 13 to its "zero" reading and for causing the indicator 13 to move in response to corresponding movement of the inner slide 29. An inner gimbal 33 is positioned in the lower portion of the inner slide 29 and includes a disc portion 35 which presses against the lowermost surface of the inner slide 29 causing it to lift when the inner gimbal 33 tilts relative to the main housing 23. An outer gimbal 37 which is held in the lower portion of the main housing 23 by the set screws 39, is pivotably connected to the inner gimbal 33 allowing it to tilt freely relative to the main housing 23 while maintaining the inner gimbal in position in the housing 23. A compression spring 41 located between the inner slide 29 and the main housing 23 serves to urge the inner slide downward against this disc portion 35 of the inner gimbal 33 so that any tilting movement of the inner gimbal 33 will produce a corresponding upward vertical movement of the inner slide 29. The upper porton 43 of the pin 45 fits snugly in the inner gimbal 33 while the lower portion 47 of the pin 45 is tapered to fit tightly in the hole being checked. For straight holes, a collet 49 with a tapered inner opening is placed in the hole and the lower portion 47 of the tapered pin 45 is positioned in the collet 49.

To measure the angularity of a tapered hole, the tapered pin 45 is inserted into the hole and then the angularity gage is placed over the upper portion 43 of the pin 45 and pushed against the surface of the workpiece 27 so that the surface 25 makes full contact therewith. The angle which the centerline of the hole varies from being perpendicular to the surface of the workpiece 27 is read directly on the face of the dial indicator 13. To measure a staight walled hole, the expanding collet 49 is first inserted into the hole then the tapered portion 47 of the pin 45 is inserted into the collet 49. The pin 45 expands the collet 49 to make a firm fit with the hole, which is very necessary for an accurate angle measurement. Then the gage is placed over the upper portion 43 of the pin 45, the same as for a tapered hole.

The operation of the angularity gage is as follows: As the centerline of the pin 45 and the housing 23 are tilted relative to each other during the measurements described above, the inner gimbal 33 including the disc portion 35 pivots about its center point, causing the inner slide 29 to be raised vertically upward which in turn raises the set screw 31 actuating the dial indicator 13. The face on the dial indicator 13 is selected to read directly the degrees and minutes that the angle of the centerline of the probe 45 is off from being perpendicular to the base of the housing 23. The spring 41 pushes the inner slide 29 back to the "zero" position when the probe no longer tilts the inner gimbal 33 centerline. The inner slide 29 is guided near the bottom by the inside wall of the housing 23 and is guided at the top by the top cover 21. In order to calibrate the angularity gage, the top cover 21 is moved sideways by means of the set screws 51. This movement in turn moves the top of the inner slide 29 so that the same angle reading is given no matter which way the inner gimbal 33 is tilted by some known standard. This can compensate for manufacturing tolerances used in fabricating the angularity gage.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made with respect to the shape of the elements without departing from the true spirit and scope of the appended claims. It can be seen that the invention may be used to measure the angularity of any size hole, straight or tapered. For holes larger than the base of the housing, a wide base adapter can be used.

Having thus set forth the nature of my invention, what I claim as new and desire to secure by Letters Patent of the United States is:

1. A gage for measuring the angularity of the centerline of a hole in a workpiece with respect to a flat surface thereon comprising, in combination, a tapered pin in the hole and an angularity gage including a dial indicator calibrated in degrees and minutes, said dial indicator having a downwardly extending plunger slidably mounted thereon, a main housing having a flat annular lowermost surface for engaging the flat surface of the workpiece, an inner slide in operative contact with said dial indicator and slidably mounted in said main housing for vertical movement therein, an inner gimbal positioned in the lower portion of said inner slide, a disc portion on the lower end of said inner gimbal in operative contact with the lowermost end of said inner slide, an outer gimbal positioned in the lower portion of the main housing, said outer gimbal being pivotably connected to said main housing to allow free tilting movement of said inner gimbal relative to said main housing and biasing means for urging said inner slide downward against said disc portion of said inner gimbal whereby any tilting movement of said inner gimbal in response to angularity of the pin when the gage is placed over the pin in the hole causes a corresponding vertically upward movement of said inner slide thereby causing the dial indicator to indicate the angularity of the pin in degrees and minutes.

2. The gage for measuring angularity defined in claim 1 wherein a set screw is mounted on said inner slide in contact with the lower end of the downwardly extending plunger on the dial indicator, said set screw being adjustable for setting the dial indicator on the proper reading.

3. The gage for measuring angularity defined in claim 2 wherein four set screws are threaded in said main housing, each of said set screws being located 90° from adjacent ones, the inner ends of said set screws contacting the side surface of said top cover to cause sideways movement thereof and corresponding movement of said inner slide thereby operating to calibrate the gage and compensate for manufacturing tolerenaces in fabricating the gage.

* * * * *